(12) United States Patent
Ozaki et al.

(10) Patent No.: US 8,201,091 B1
(45) Date of Patent: Jun. 12, 2012

(54) PROGRAM SYNTHESIZING DEVICE AND PROGRAM SYNTHESIZING METHOD

(75) Inventors: Satoshi Ozaki, Tokyo (JP); Naoki Esaka, Tokyo (JP); Kensaku Fujimoto, Tokyo (JP); Shirou Wakayama, Tokyo (JP); Kenji Odaka, Tokyo (JP); Yosuke Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/197,556

(22) Filed: Aug. 3, 2011

(30) Foreign Application Priority Data

Nov. 30, 2010 (JP) ................................ 2010-266714

(51) Int. Cl.
*G06F 3/00* (2006.01)
(52) U.S. Cl. ........................................ 715/723; 715/733
(58) Field of Classification Search .................. 715/723, 715/733
See application file for complete search history.

(56) References Cited

U.S. PATENT DOCUMENTS

| | | | | |
|---|---|---|---|---|
| 2001/0050679 A1* | 12/2001 | Shigeta | ........................... | 345/204 |
| 2004/0017513 A1* | 1/2004 | Takahashi | ..................... | 348/552 |
| 2004/0130568 A1* | 7/2004 | Nagano et al. | ................. | 345/733 |
| 2006/0028584 A1* | 2/2006 | Iizuka et al. | ................... | 348/584 |
| 2009/0244385 A1* | 10/2009 | Wakayama et al. | ........... | 348/584 |

FOREIGN PATENT DOCUMENTS

| | | |
|---|---|---|
| JP | 2001-265645 | 9/2001 |
| JP | 2003-303102 | 10/2003 |
| JP | 2009-239479 | 10/2009 |

* cited by examiner

*Primary Examiner* — Tuyetlien Tran
(74) *Attorney, Agent, or Firm* — Blakely, Sokoloff, Taylor & Zafman LLP

(57) ABSTRACT

The program synthesizing device according to the embodiment of the present invention includes: a coupling unit configured to couple an information acquiring plug-in module, an information processing plug-in module, and a presentation plug-in module through their input interfaces and output interfaces based on a mashup scenario; a plug-in module driving unit configured to sequentially drive the coupled plug-in modules; an information acquiring unit configured to acquire information when the information acquiring plug-in module is driven; an information processing unit configured to perform a predetermined process on the information when the information processing plug-in module is driven; an object resolving unit configured to determine a value of object presented by a specified presentation scenario when the presentation plug-in module is driven; and a program output unit configured to output a program being a presentation scenario in which the object value is resolved.

14 Claims, 8 Drawing Sheets

PROGRAM SYNTHESIZING DEVICE AND PROGRAM SYNTHESIZING METHOD

CROSS REFERENCE TO RELATED APPLICATIONS

This application is based upon and claims the benefit of priority from the prior Japanese Patent Application No. 2010-266714, filed on Nov. 30, 2010, the entire contents of which are incorporated herein by reference.

FIELD

The embodiment of the present invention relates to a program synthesizing device and a program synthesizing method.

BACKGROUND

As a conventional art, there is known a program synthesizing device which synthesizes a program by acquiring information (resources) from various locations such as a server on the Internet. A series of steps from acquiring the information to synthesizing the program is described as a scenario, and the synthesis of the program is realized by playing (reproducing) the scenario. The scenario describes detailed instructions: the instruction acquiring information from the location, the instruction of how the acquired information is processed, and the instruction of how objects of processed information is presented (as to movement, color, etc.).

Concretely, these instructions in the scenario are established by describing instruction codes in the scripts included in the scenario. Since much time and effort are required to describe instruction codes, a simpler method for creating the scenario (namely, a program) has been desired.

DETAILED DESCRIPTION

Figure 1:
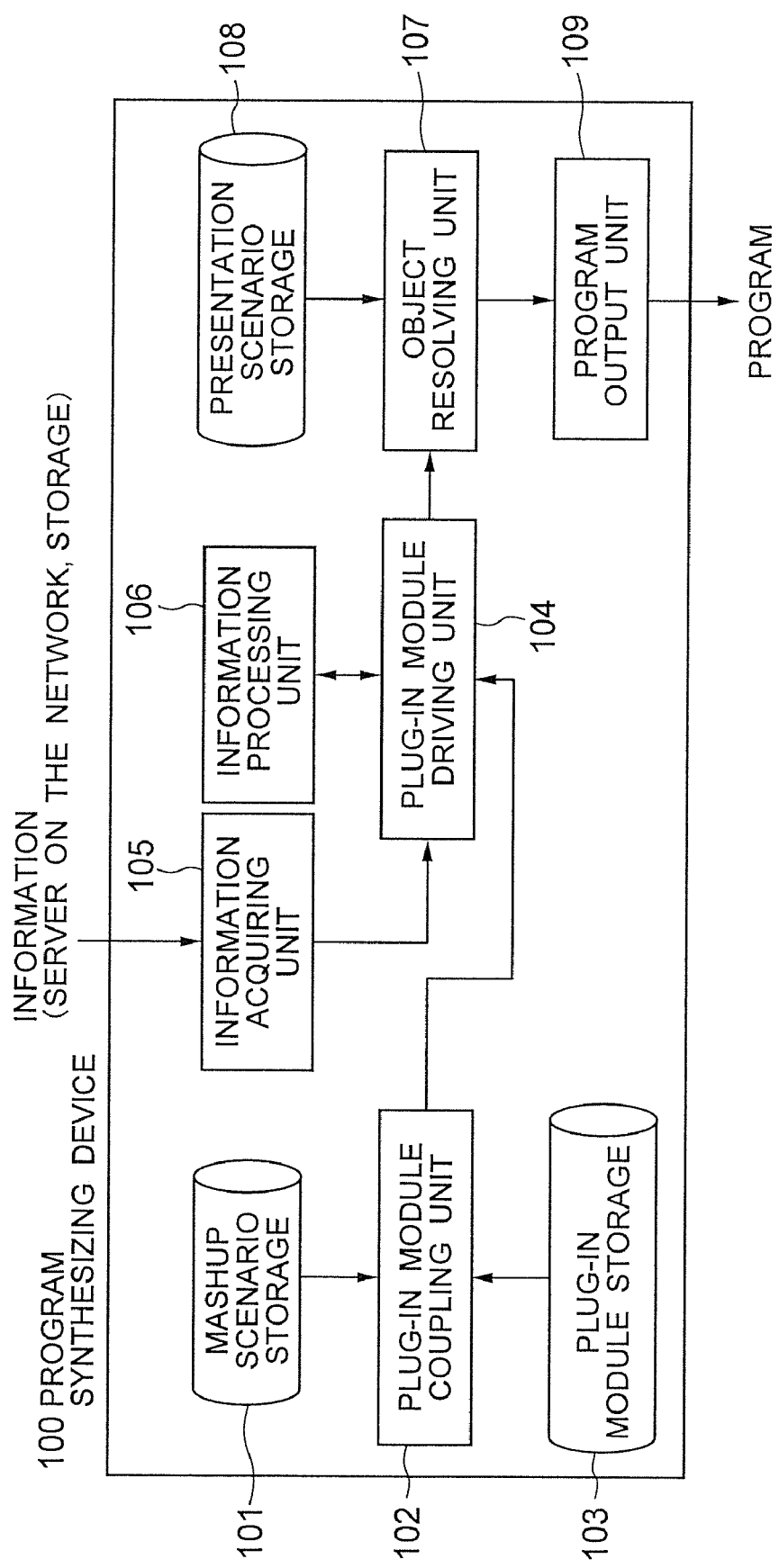
FIG. 1 is a block diagram showing a program synthesizing device according to an embodiment of the present invention.

According to an embodiment, there is provided a program synthesizing device including: a presentation scenario storage, a plug-in module storage, a presentation plug-in module, a plug-in module coupling unit, a plug-in module driving unit, an information acquiring unit, an information processing unit, an object resolving unit, and a program output unit.

The presentation scenario storage stores a presentation scenario describing how to present an object having an undetermined value The plug-in module storage stores a plurality of plug-in modules including:
an information acquiring plug-in module to acquire information from a specified location and to define an output interface for outputting the information; and
an information processing plug-in module configured to define an input interface for receiving information, to perform a predetermined process on the information, and to define an output interface for outputting the processed information; and The presentation plug-in module defines an input interface for receiving information, and to resolve the value of the object to be presented by a specified presentation scenario based on the information.

The plug-in module coupling unit selects and reads, from the plug-in module storage, at least one information acquiring plug-in module, one information processing plug-in module, and one presentation plug-in module based on a mashup scenario, specifies a location and a presentation scenario to be used by the read information acquiring plug-in module and presentation plug-in module, respectively and generates coupled plug-in modules by coupling all of the read plug-in modules through their input interfaces and output interfaces.

The plug-in module driving unit sequentially drives the coupled plug-in modules, and manage information inputted and outputted through the input interface and the output interface of each plug-in module included in the coupled plug-in modules;

The information acquiring unit acquires the information from the specified location when the information acquiring plug-in module is driven by the plug-in module driving unit.

The information processing unit performs the predetermined process on the information given to the input interface of the information processing plug-in module when the information processing plug-in module is driven by the plug-in module driving unit.

The object resolving unit reads the specified presentation scenario from the presentation scenario storage when the presentation plug-in module is driven by the plug-in module driving unit in order to determine a value of the object to be presented by the specified presentation scenario based on the information given to the input interface of the presentation plug-in module.

The program output unit outputs a program being a presentation scenario in which the value of the object is resolved.

Hereinafter, the embodiment of the present invention will be explained in detail, referring to the drawings.

In the embodiment, coupling of plug-in modules is executed to expresses acquiring of information, processing of the information and presenting of objects, which makes it possible for a user to simply create a program without requiring him/her to describe scripts.

Figure 2:
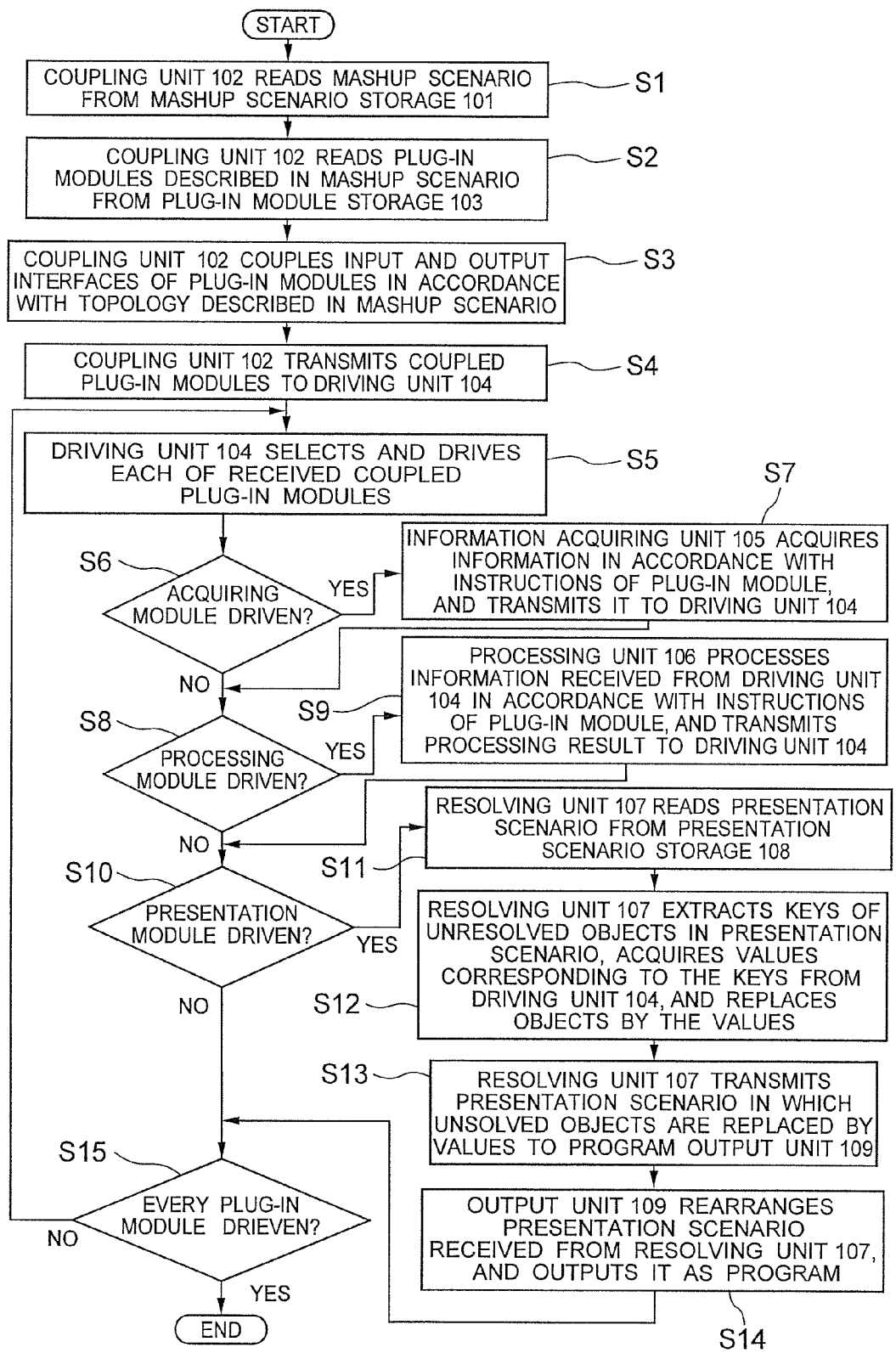
FIG. 2 is a flow chart showing the flow of operation performed by the program synthesizing device of FIG. 1.

FIG. 1 is a block diagram showing a program synthesizing device according to an embodiment of the present invention. FIG. 2 is a flow chart showing the flow of operation performed by the program synthesizing device of FIG. 1.

The program synthesizing device of FIG. 1 synthesizes a program to be viewed by a user by collecting information from a location such as a server on a network (e.g., the Internet or local network) or an internal storage of a user device. The program synthesizing device of FIG. 1 may be a stand-alone type or may be incorporated into a user device such as television device, personal computer (PC), mobile device, etc. In the case of a stand-alone type, the program synthesizing device may be connected to a user device having a display for displaying a generated program transmitted thereto.

The program synthesizing device may be realized in the form of software to be executed by a computer. In this case, the software is stored in a recording medium such as hard disk, memory device, CD-ROM, etc., and executed by being read by the computer.

The program synthesizing device can communicate with a server on a network such as the Internet or local network. When the program synthesizing device is incorporated into a user device, the program synthesizing device may communicate with the server by using a communication function of the user device.

The program synthesizing device of FIG. 1 includes: a mashup scenario storage 101; a plug-in module coupling unit 102; a plug-in module storage 103; a plug-in module driving unit 104; an information acquiring unit 105; an information processing unit 106; an object resolving unit 107; a presentation scenario storage 108; and a program output unit 109.

The plug-in module storage 103 stores a plurality of plug-in modules. Each plug-in module is one of the following: an information acquiring plug-in module describing an instruction for acquiring information; an information processing plug-in module describing an instruction for processing the information; and a presentation plug-in module describing an instruction for presenting objects.

The information acquiring plug-in module is used to acquire various information items. For example, the information acquiring plug-in module can acquire information from a server on a network (e.g., a file in the server specified by a URL) by using a WebAPI, or can acquire information from the storage incorporated into a user device by using an API of the device. The information acquiring plug-in module has an output interface for outputting acquired information.

The information processing plug-in module is used to perform various processes. For example, the information processing plug-in module can extract data from structured data (information), calculate a value, and rearrange information items. The information processing plug-in module handles the information obtained by the information acquiring plug-in module, or the information processed by another information processing plug-in module. The information processing plug-in module has an input interface for receiving the information to be processed, and an output interface for outputting processed information.

The presentation plug-in module has a function of resolving the objects each specified by a parameter in an after-mentioned presentation scenario (determining the value of each object expressed by a key.) In order to resolve each object, a hash list formed of pairs each consisting of a key and a value (set of (key and value) data) can be used, for example. This hash list can be obtained as an output from the information processing plug-in module, and the presentation plug-in module has an input interface for receiving the hash list.

The mashup scenario storage 101 stores a mashup scenario. The mashup scenario is an instruction document recording: a graph structure (topology) showing how to select and couple the plug-in modules; and parameters to be given to each plug-in module as needed. The mashup scenario can be described in a tag-based description language as in an XML format.

The plug-in module coupling unit 102 reads a mashup scenario from the mashup scenario storage 101 (step S1), and reads the plug-in modules described in the mashup scenario from the plug-in module storage 103 (step S2.)

The plug-in module coupling unit 102 couples the input and output interfaces of the read plug-in modules in accordance with the graph structure (topology) described in the mashup scenario, thereby coupled plug-in modules being obtained (step S3.)

Figure 3:
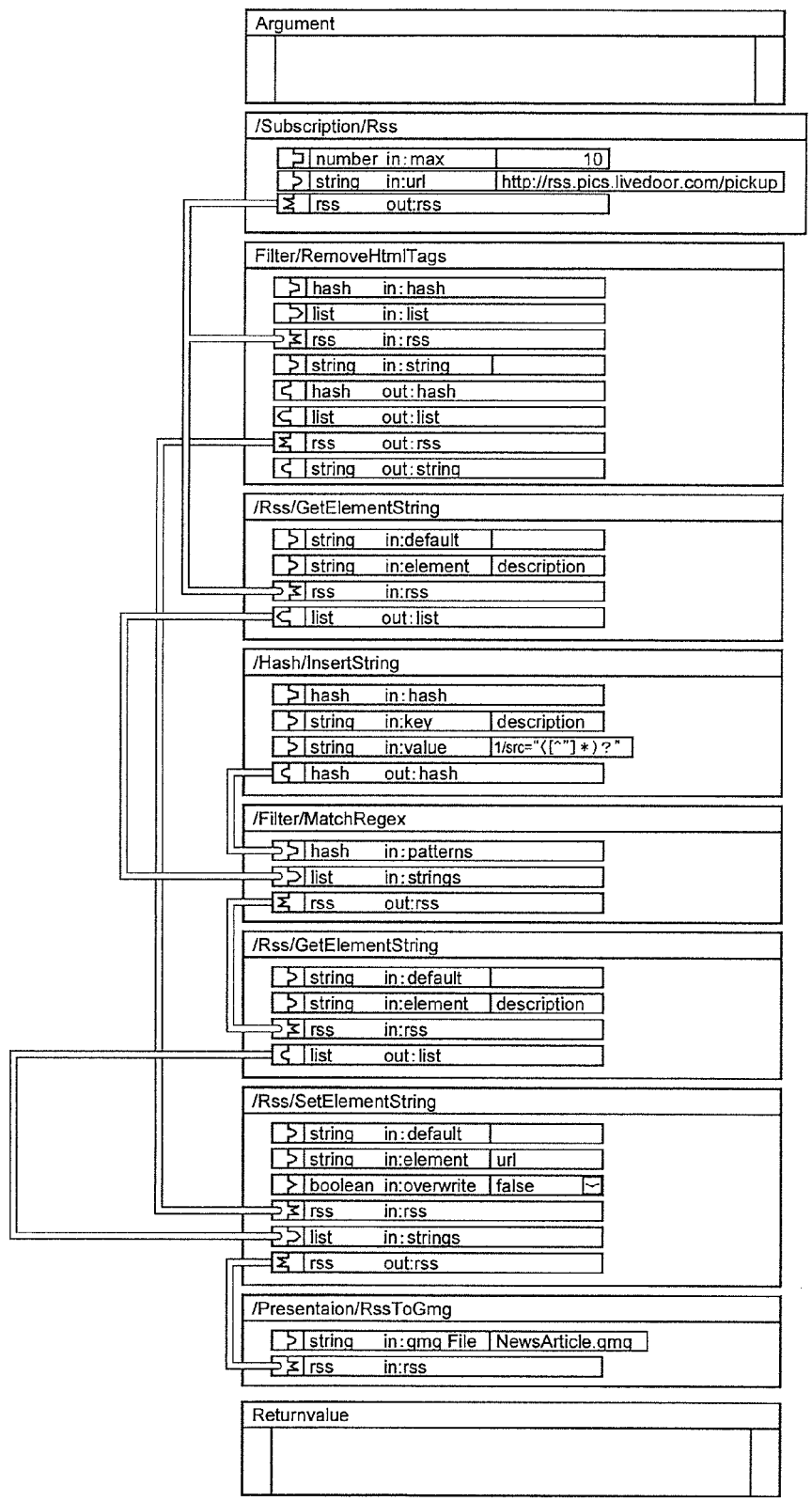
FIG. 3 is a diagram showing an example of coupled plug-in module generated by a plug-in module coupling unit.

FIG. 3 shows an example of the coupled plug-in modules generated by the plug-in module coupling unit 102.

In FIG. 3, each box (large rectangle) shows a plug-in module, and a module name such as "/Subscription/Rss" or "Filter/RemoveHtmlTags" is described at the top of each box.

In FIG. 3, "/Subscription/Rss" situated in the second highest position (uppermost non-blank box) is the information acquiring plug-in module, each of the subsequent six modules "/Filter/RemoveHtmlTags," "/Rss/GetElementString," "/Hash/InsertString," "/Filter/MatchRegex," "/Rss/GetElementString," and "/Rss/SetElementString" is the information processing plug-in module, and "/Presentation/RsstoGmg" situated in the second lowest position (lowermost non-blank box) is the presentation plug-in module.

Each plug-in module includes one or more items (input items, output items) as input interfaces and output interfaces.

Each item may have "argument type," "argument name," and "argument value," and at least the former two are essential. The argument value is described in a small rectangular field (parameter input field) arranged on the right side of the argument name (no parameter input field is arranged for an item having no argument value specified by a parameter.) For example, in "/Subscription/Rss" (information acquiring plug-in module), the value of "10" is specified in the parameter input field as a parameter for the argument "in:max."

The item having "in:" before the argument name is an input item meaning that data or a parameter should be inputted into the module. The item having "out:" before the argument name is an output item meaning that data should be outputted from the module.

The plug-in modules are coupled through the input interface and the output interface. In FIG. 3, the pipy thick line shows the coupling between the plug-in modules. This coupling shows the relationship of information to be inputted and outputted between the plug-in modules. In the example shown in FIG. 3, the plug-in modules are aligned so that the data outputted from the plug-in module coupled on the upper side of the pipe is inputted into the plug-in module coupled on the lower side of the pipe. In other words, the boxes showing the plug-in modules are arranged and coupled so that data constantly flows from the top to the bottom. Note that how to arrange and couple the plug-in modules shown in FIG. 3 is merely an example, and the present embodiment is not limited thereto.

Each plug-in module acquires data or parameters in accordance with valid input items (input items each coupled with another plug-in module through the pipe, or input items each having a parameter specified in the parameter input field.) Each plug-in module performs its unique module process (for acquiring data, processing data, or resolving objects) based on the acquired data or parameters, and outputs the processed data in accordance with valid output items (output items each connected to the pipe.) As stated above, the process to be performed by each plug-in module is described in a tag-based description language, but the description is not shown in the drawings since it is not the essential matter of the present embodiment.

Each plug-in module having a parameter input field obtains the value specified in the input field as a parameter, and uses the parameter when performing its module processing. Further, each plug-in module having an input item coupled with another plug-in module through the pipe obtains the data outputted from the coupled plug-in module, and uses the data when performing its module processing. Each input item which is not coupled with another plug-in module and has a blank parameter input field (invalid input item) is not used to obtain the data or parameter therefor.

For example, "/Subscription/Rss" (information acquiring plug-in module) situated in the second highest position (uppermost non-blank box) shows that 10 items included in RSS should be acquired from "http://rss.pics.livedoor.com/pickup" specified as the parameter. The acquired information (rss type) is outputted to "/Filter/RemoveHtmlTags" and "/Rss/GetElementString" (information processing plug-in modules.) Note that there are a plurality of RSS standards (versions) having different names such as RDF Site Summary, Rich Site Summary, and Really Simple Syndication, and the RSS handled in the present embodiment includes every of them. Further, Atom is regarded as a kind of RSS in a broad sense. In RSS, the information of a website is structured and described in a tag-based description language such as XML and HTML, and the data kind of each information can be identified by identifying the tag.

Further, "/Filter/RemoveHtmlTags" (information processing plug-in module) arranged immediately below "/Subscription/Rss" means that a predetermined process (for removing unnecessary elements such as HTML tags) is performed using the information outputted from "/Subscription/Rss" to output the processed information to "/Rss/SetElementString."

This "/Filter/RemoveHtmlTags" and subsequent five information processing plug-in modules "/Rss/GetElementString," "/Hash/InsertString," "/Filter/MatchRegex," "/Rss/GetElementString," and "/Rss/SetElementString" each performs a process for removing unnecessary tags or extracting information from the information acquired by the information acquiring plug-in module, and a hash list formed of pairs each consisting of a key and a value is outputted from the output interface ("rss out: rss") of "/Rss/SetElementString."

"/Presentation/RsstoGmg" (presentation plug-in module) situated in the second lowest position (lowermost non-blank box) receives "NewsArticle.gmg" specified as a presentation scenario, and inputted with the hash list outputted from the above information processing plug-in module "/Rss/SetElementString." This "/Presentation/RsstoGmg" resolves each object used in the presentation scenario "NewsArticle.gmg" by using the hash list (determines the value of each object expressed by a key in the presentation scenario.)

Referring back to FIG. 2, the plug-in module driving unit 104 sequentially selects and drives the coupled plug-in modules obtained by the plug-in module coupling unit 102 (step S5.) The driving process means to instruct the processing unit (information acquiring unit, information processing unit, or object resolving unit) to execute the description of the selected plug-in module corresponding thereto, by transmitting, to the processing unit, the description of the selected plug-in module and the information to be inputted into the module. The coupled plug-in modules are sequentially driven corresponding to the flow of data (from the uppermost box) in accordance with the coupling order of the plug-in modules. By sequentially driving the plug-in modules corresponding to the flow of data, the data dependency relation among the plug-in modules can be maintained. Note that the number of plug-in modules to be selected at one time may be one or plural as long as the data dependency relation can be maintained.

When the information acquiring plug-in module is driven by the plug-in module driving unit 104 (Yes at step S6), the information acquiring unit 105 acquires information from the external location by interpreting and executing the description of the information acquiring plug-in module, and transmits the acquired information to the plug-in module driving unit 104 (step S7.) The plug-in module driving unit 104 has a function of managing the argument data handled by the module, and transmits the argument data (e.g., URL from which information should be acquired) to the information acquiring unit 105 when driving the information acquiring plug-in module.

On the other hand, when the information processing plug-in module is driven by the plug-in module driving unit 104 (Yes at step S8), the information processing unit 106 processes the information to be processed by interpreting and executing the description of the information processing plug-in module, and transmits the processed information to the plug-in module driving unit 104 (step S9.) The plug-in module driving unit 104 manages the information to be processed and parameters required for the process, and the plug-in module driving unit 104 transmits these data items to the information processing unit 106 when driving the information processing plug-in module. For example, when the input interface of the information processing plug-in module is coupled with the output interface of another plug-in module, the information obtained by the another plug-in module is transmitted to the information processing plug-in module.

Further, when the presentation plug-in module is driven by the plug-in module driving unit 104 (Yes at step S10), the object resolving unit 107 specifies the presentation scenario to be used by interpreting and executing the description of the presentation plug-in module, and resolves the objects in the scenario (step S11 to S14.) The plug-in module driving unit 104 manages the argument data handled by the presentation plug-in module (e.g., the identifier of the presentation scenario to be used), and transmits this data to the object resolving unit 107 when driving the presentation plug-in module. Hereinafter, steps S11 to S14 will be explained in detail.

First, the presentation scenario will be explained in detail. The presentation scenario is an instruction document describing: the definition of various objects (text, graphic, image, music, sound effect, sound, moving image, etc.) appearing in a program; the presentation concerning the timing when each object appears in and disappears from the program, colors, actions (movement (including stillness), change in form, etc.); the response to the event such as button pushing and key input. The presentation scenario can be described in the format of XML, for example.

Note that the values of some objects described in the presentation scenario are not determined (unresolved), and expressed by variables (keys). In other words, although how to present the some objects in terms of appearance timing etc. is concretely described in the presentation scenario, but the content of the objects are specified by variables (keys). Therefore, object values should be determined (objects should be resolved) in order to complete the presentation scenario as a program.

Figure 4:
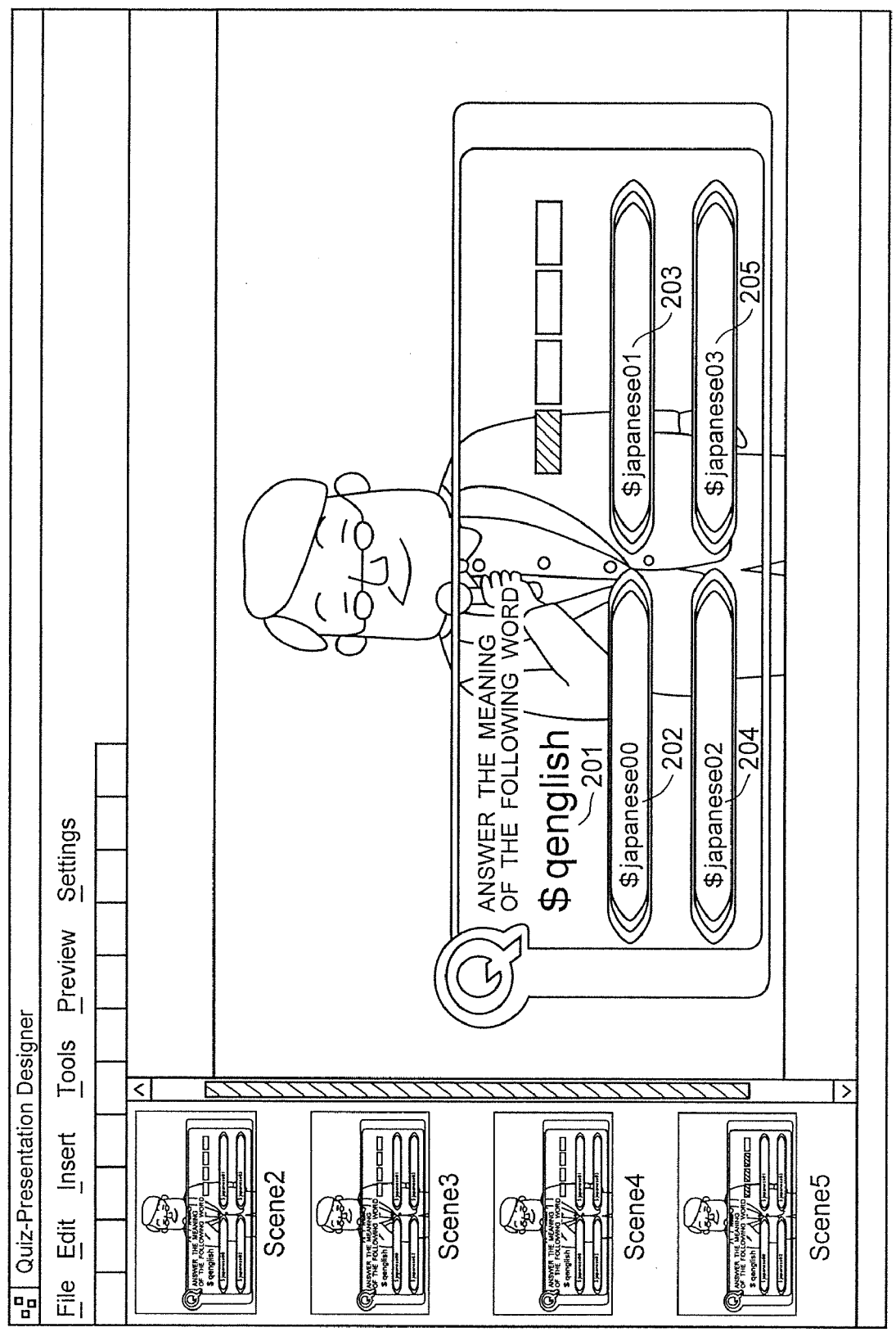
FIG. 4 is a diagram showing an example of the edit screen of a presentation scenario.

Here, FIG. 4 shows an example of the edit screen of a presentation scenario.

The presentation scenario is described in XML, for example, but a user can graphically create and edit the presentation scenario by the operation similar to that for creating a power point (registered trademark) animation, without considering XML. Therefore, a user is not required to manually describe scripts. In FIG. 4, in the presentation scenario (Scene 3) concerning an English quiz displayed in the large area, the keys of the objects are expressed as "$foobar." That is, the keys of five objects 201, 202, 203, 204, and 205 are expressed as "$qenglish," "$japanese00," "$japanese01," "$japanese02," and "$japanese03." The values of these objects are undetermined.

Referring back to FIG. 2, at step S11, the object resolving unit 107 receives the description of the presentation plug-in module and parameters, and reads, from the presentation scenario storage 108, the presentation scenario specified by the parameters (e.g., the presentation scenario of Scene 3 shown in FIG. 4).

Next, the object resolving unit 107 extracts the keys of unresolved objects included in the read presentation scenario, makes a request to acquire the values corresponding to the keys from the plug-in module driving unit 104, and replaces the objects by the acquired values (step S12.) That is, the objects are resolved (step S12.) The values corresponding to the keys are specified by the hash list outputted from the information processing plug-in module. In the example of FIG. 3, the values corresponding to the keys are acquired from the hash list outputted from "/Rss/SetElementString." Note that the object resolving unit 107 may specify the values corresponding to the keys by itself based on the hash list received together with the description of the presentation plug-in module, instead of making an inquiry to the plug-in module driving unit 104.

When the key of every object is replaced by each value, that is, when every object is resolved, the object resolving unit 107 transmits the resolved presentation scenario to the program output unit 109 (step S13.)

The program output unit 109 rearranges the presentation scenario received from the object resolving unit 107, and outputs it as a program (step S14.)

Figure 6:
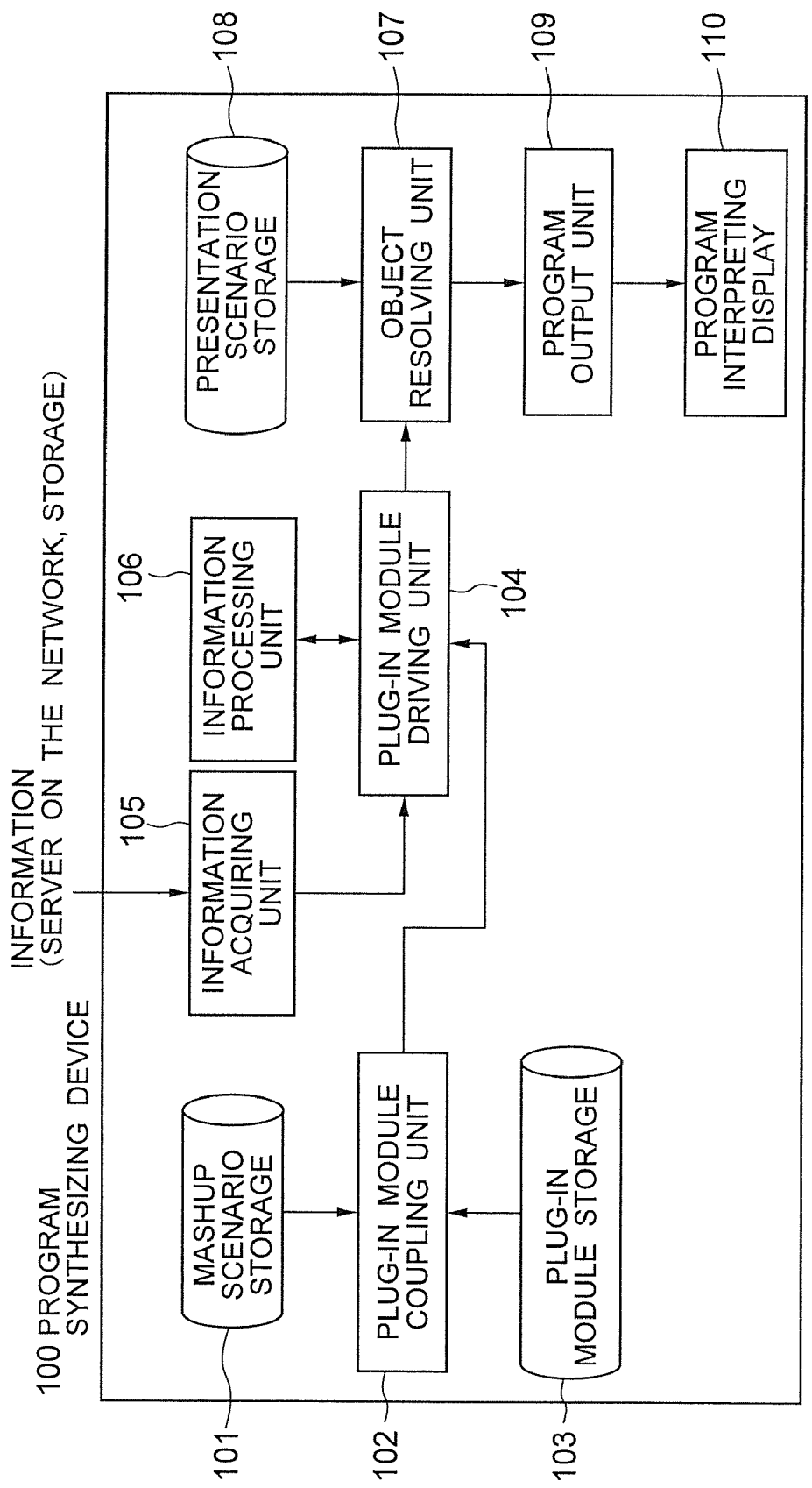
FIG. 6 is a diagram showing another structural example of the program synthesizing device according to the embodiment of the present invention.

Here, the program to be outputted may be the presentation scenario itself in which every object is resolved, or may be a version obtained by converting the resolved presentation scenario into a specific language. As the specific language, a markup language such as SMIL (Synchronized Multimedia Integration Language) and HTML can be employed. As stated above, the program may be outputted in an arbitrary form. The outputted program is interpreted by a program interpreting display of the user device to be displayed thereon. The program interpreting display may be incorporated into a program synthesizing device 100. In this case, a program interpreting display 110 may be added in the latter stage of the program output unit 109, as shown in FIG. 6.

Figure 5:
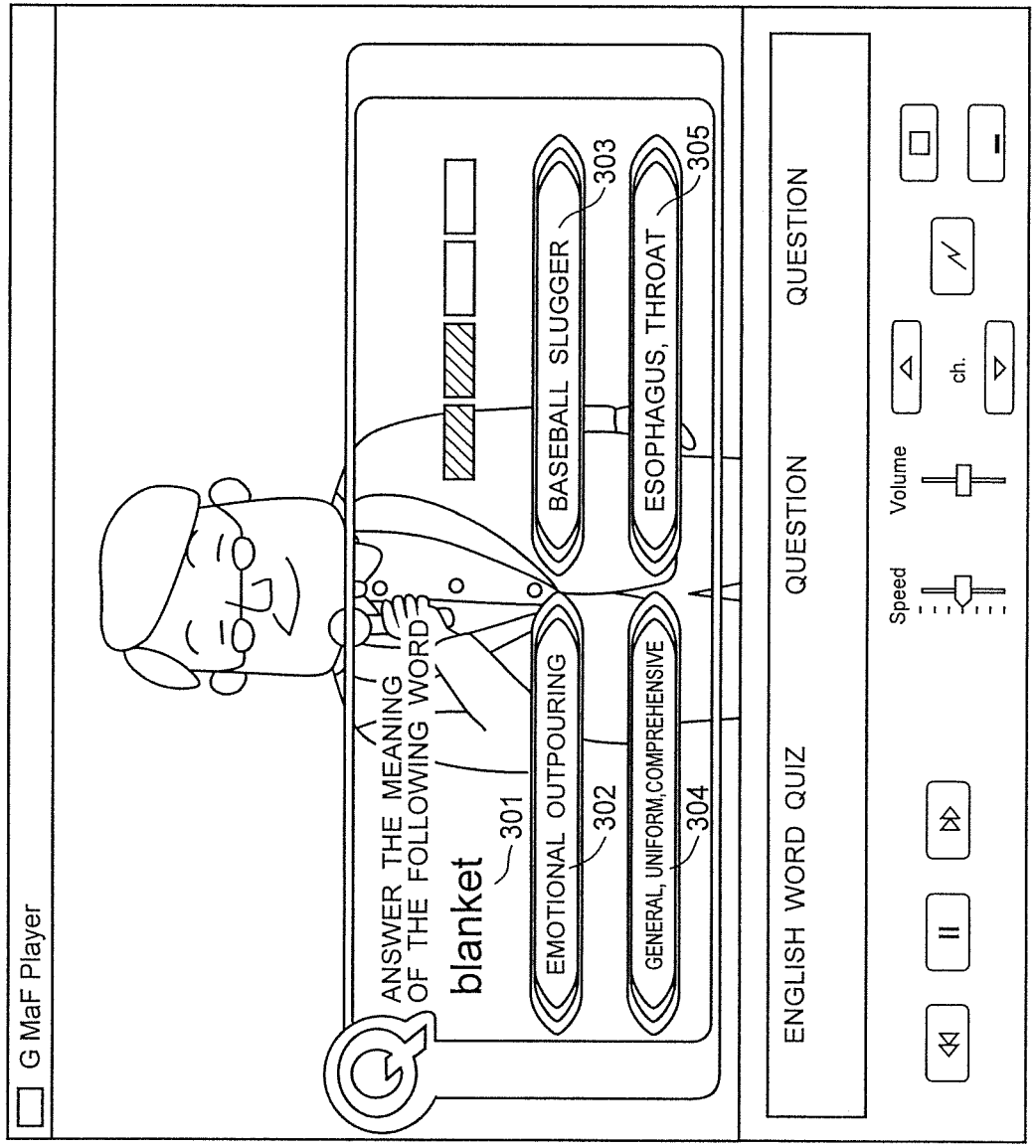
FIG. 5 is a diagram showing an example of a synthesized program.

FIG. 5 shows an example of a program in which every object is resolved. The keys of five objects in FIG. 4 are replaced by the actual values shown by reference numbers 301, 302, 303, 304, and 305. That is, "$qenglish" shown in FIG. 4 is replaced by "blanket," "$japanese00" is replaced by "emotional outpouring," "$japanese01" is replaced by "baseball slugger," "$japanese02" is replaced by "general, uniform, comprehensive," and "$japanese03" is replaced by "esophagus, throat."

The plug-in module driving unit 104 judges whether every plug-in module included in the coupled plug-in modules has been driven (step S15.) When every plug-in module has not been driven yet (No at step S15), the flow returns to step S5. When every plug-in module has been driven (Yes at step S15), the main process is ended.

Figure 7:
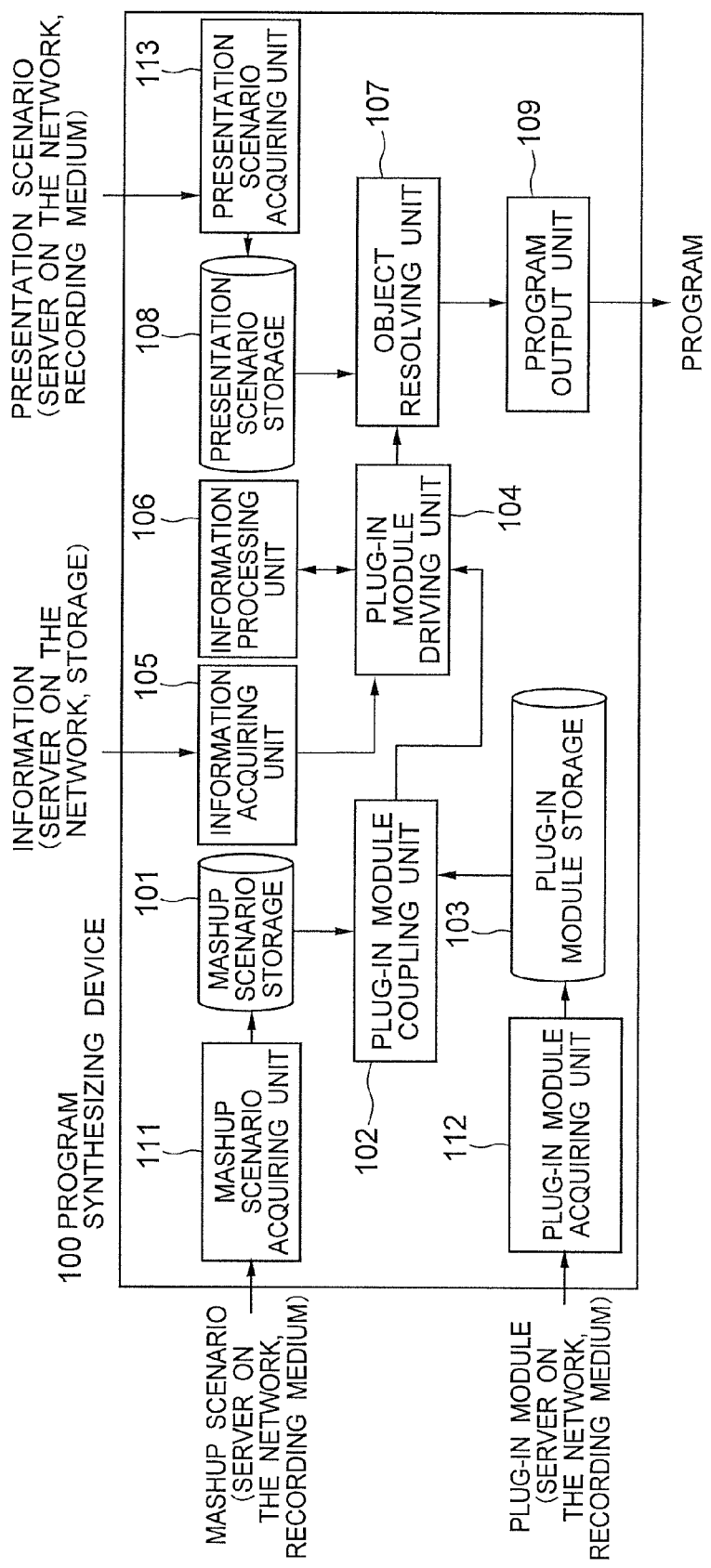
FIG. 7 is a diagram showing further another structural example of the program synthesizing device according to the embodiment of the present invention.

In the above embodiment, the mashup scenario is previously stored in the mashup scenario storage 101. Alternatively, as shown in FIG. 7, a mashup scenario acquiring unit 111 may be arranged to acquire the mashup scenario from a recording medium or a server on the network, and to store the acquired mashup scenario in the mashup scenario storage 101.

Further, in the above embodiment, each plug-in module is previously stored in the plug-in module storage 103. Alternatively, as shown in FIG. 7, a plug-in module acquiring unit 112 may be arranged to acquire the plug-in module from a recording medium or a server on the network, and to store the acquired plug-in module in the plug-in module storage 103. The plug-in module may be acquired by the plug-in module acquiring unit 112 responding to the instruction by the plug-in module coupling unit 102, based on the mashup scenario. Instruction may be given to acquire only plug-in modules which are specified by the mashup scenario and are not stored in the plug-in module storage 103.

Furthermore, in the above embodiment, the presentation scenario is previously stored in the presentation scenario storage 108. Alternatively, as shown in FIG. 7, a presentation scenario acquiring unit 113 may be arranged to acquire the presentation scenario from a recording medium or a server on the network, and to store the acquired presentation scenario in the presentation scenario storage 108. When driving the coupled plug-in modules, the presentation scenario may be acquired by the presentation scenario acquiring unit 113 responding to the instruction by the plug-in module driving unit 104, based on the parameters specified by the presentation plug-in module.

Here, any recording medium can be used as long as it is a storage which can be accessed from the program synthesizing device. For example, the following can be used as the recording medium: a storage (memory device, hard disk device, etc.) in the user device; a disk storage such as CD-ROM and CD-R; and USB memory, memory card, etc. removable from the user device.

Figure 8:
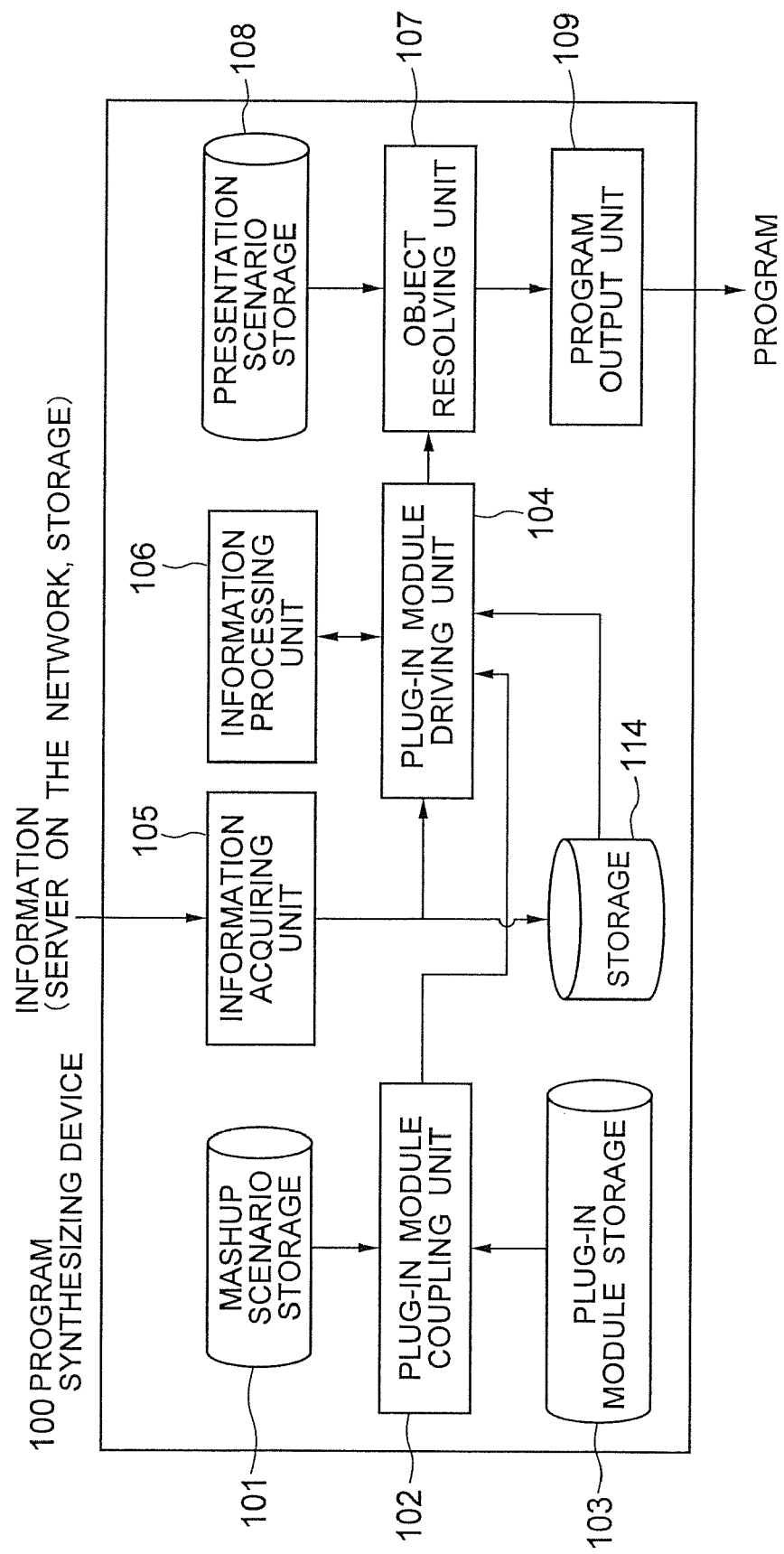
FIG. 8 is a diagram showing still further another structural example of the program synthesizing device according to the embodiment of the present invention.

Further, as shown in FIG. 8, a storage 114 may be arranged to store a set consisting of the used mashup scenario and the information acquired by the information acquiring unit 105. Accordingly, even when the information stored in the external location (e.g., information on the Internet) is updated, the user can view a previously viewed program again if he/she wants to by using the information of the storage 114. In this case, the value of parameter given to the information acquiring plug-in module should be rewritten so that the source of information to be acquired by the acquiring plug-in module shows the inside of the storage 114 instead of the original location.

Note that the plug-in module or presentation scenario used in the mashup scenario may also be stored in the storage 114. Accordingly, the mashup scenario can be reproduced even when the plug-in module or presentation scenario acquired from the Internet etc. as in FIG. 7 disappears from the Internet etc.

In the above embodiment, the mashup scenario may nest a plurality of different mashup scenarios. In this case, the mashup scenarios are sequentially used to link their outputs.

As stated above, the program synthesizing device of the present embodiment expresses the information to be acquired/processed and the objects to be presented by selecting and coupling the plug-in modules, by which the user can synthesize a program by freely converting the form of information to be acquired, processed, presented, and outputted, without describing scripts.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A program synthesizing device comprising:
   a presentation scenario storage configured to store a presentation scenario describing how to present an object having an undetermined value;
   a plug-in module storage configured to store a plurality of plug-in modules including:
      an information acquiring plug-in module to acquire information from a specified location and to define an output interface for outputting the information; and
      an information processing plug-in module configured to define an input interface for receiving information, to perform a predetermined process on the information, and to define an output interface for outputting the processed information; and
   a presentation plug-in module configured to define an input interface for receiving information, and to resolve a value of the object to be presented by a specified presentation scenario based on the information;
   a plug-in module coupling unit configured to select and read, from the plug-in module storage, at least one information acquiring plug-in module, one information processing plug-in module, and one presentation plug-in module based on a mashup scenario, to specify a location and a presentation scenario to be used by the read information acquiring plug-in module and presentation plug-in module, respectively and to generate coupled plug-in modules by coupling all of the read plug-in modules through their input interfaces and output interfaces;
   a plug-in module driving unit configured to sequentially drive the coupled plug-in modules, and to manage information inputted and outputted through the input interface and the output interface of each plug-in module included in the coupled plug-in modules;
   an information acquiring unit configured to acquire the information from the specified location when the information acquiring plug-in module is driven by the plug-in module driving unit;
   an information processing unit configured to perform the predetermined process on the information given to the input interface of the information processing plug-in module when the information processing plug-in module is driven by the plug-in module driving unit;
   an object resolving unit configured to read the specified presentation scenario from the presentation scenario storage when the presentation plug-in module is driven by the plug-in module driving unit in order to determine the value of the object to be presented by the specified presentation scenario based on the information given to the input interface of the presentation plug-in module; and
   a program output unit configured to output a program being a presentation scenario in which the value of the object is resolved.

2. The device of claim 1, comprising:
   a mashup scenario acquiring unit configured to acquire the mashup scenario from an accessible recording medium or a server on a network; and
   the mashup scenario storage configured to store the mashup scenario acquired by the mashup scenario acquiring unit,
   wherein the plug-in module coupling unit reads the mashup scenario from the mashup scenario storage.

3. The device of claim 1, further comprising:
   a presentation scenario acquiring unit configured to acquire the presentation scenario from an accessible recording medium or a server on a network,
   wherein the presentation scenario storage stores the presentation scenario acquired by the presentation scenario acquiring unit.

4. The device of claim 1, further comprising:
   a plug-in module acquiring unit configured to acquire the information acquiring plug-in module, the information processing plug-in module, and the presentation plug-in module from an accessible recording medium or a server on a network,
   wherein the plug-in module storage stores the information acquiring plug-in module, the information processing plug-in module, and the presentation plug-in module acquired by the plug-in module acquiring unit.

5. The device of claim 1, wherein when the mashup scenario nests a plurality of mashup scenarios, the plug-in module coupling unit sequentially handles the plurality of mashup scenarios included in the mashup scenario.

6. The device of claim 1, further comprising:
   a storage configured to store a previously used mashup scenario, and information acquired by the information acquiring plug-in module in the previously used mashup scenario,
   wherein the plug-in module coupling unit selects and uses the mashup scenario stored in the storage, and
   the information acquiring plug-in module acquires information from the storage serving as the location.

7. The device of claim 1 further comprising a program interpreting display configured to interpret and display the program outputted from the program output unit.

8. A program synthesizing method executed by a computer, comprising:
   reading a plurality of plug-in modules from a plug-in module storage in accordance with a mashup scenario, the plug-in modules including:
      an information acquiring plug-in module configured to acquire information from a specified location and to define an output interface for outputting the information;
      an information processing plug-in module configured to define an input interface for receiving information, to perform a predetermined process on the information, and to define an output interface for outputting the processed information; and
      a presentation plug-in module configured to define an input interface for receiving information, and to resolve a value of the object to be presented by a specified presentation scenario based on the information;
   specifying, in accordance with the mashup scenario, a location and a presentation scenario to be used by the read information acquiring plug-in module and presentation plug-in module, respectively, and for generating coupled plug-in modules by coupling all of the read plug-in modules through their input interfaces and output interfaces;
   driving the coupled plug-in modules, sequentially;
   managing information inputted and outputted through the input interface and the output interface of each plug-in module included in the coupled plug-in modules;
   acquiring the information from the specified location when the information acquiring plug-in module is driven;
   performing the predetermined process on the information given to the input interface of the information processing plug-in module when the information processing plug-in module is driven;

reading the specified presentation scenario from a presentation scenario storage when the presentation plug-in module is driven in order to determine the value of the object to be presented by the read presentation scenario based on the information given to the input interface of the presentation plug-in module; and outputting a program being a presentation scenario in which the value of the object is resolved.

9. The method of claim 8 further comprising:

acquiring the mashup scenario from an accessible recording medium or a server on a network to store the acquired mashup scenario in a mashup scenario storage; and reading a mashup scenario to be used from the mashup scenario storage.

10. The method of claim 8 further comprising acquiring the presentation scenario from an accessible recording medium or a server on a network to store the acquired presentation scenario in the presentation scenario storage.

11. The method of claim 8 further comprising acquiring the information acquiring plug-in module, the information processing plug-in module, and the presentation plug-in module from an accessible recording medium or a server on a network to store the acquired information acquiring plug-in module, information processing plug-in module, and presentation plug-in module in the plug-in module storage.

12. The method of claim 8, wherein when the mashup scenario nests a plurality of mashup scenarios, the mashup scenarios included in the mashup scenario are sequentially handled.

13. The method of claim 8, comprising:

storing, in a storage, a used mashup scenario, and information acquired in accordance with the information acquiring plug-in module in the used mashup scenario, wherein the mashup scenario stored in the storage is selected and used in a plug-in module coupling step, and the information acquiring plug-in module acquires information from the storage serving as the location.

14. The method of claim 8 further comprising interpreting and displaying the program outputted from the program output unit.

* * * * *